United States Patent Office 3,362,729
Patented Jan. 9, 1968

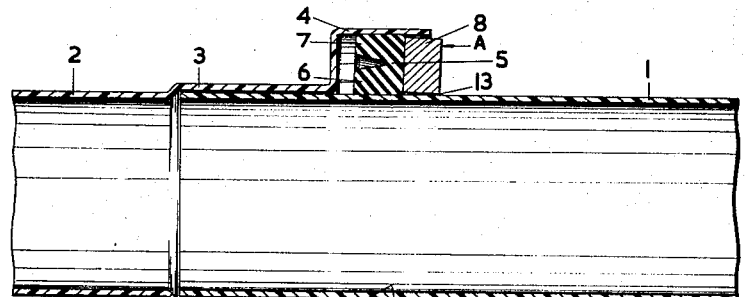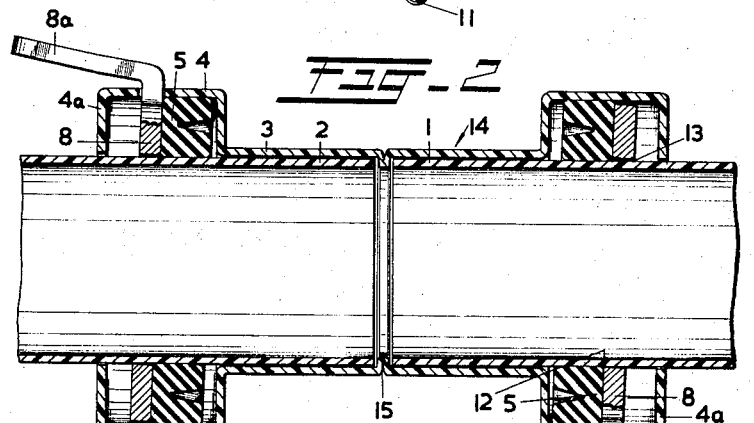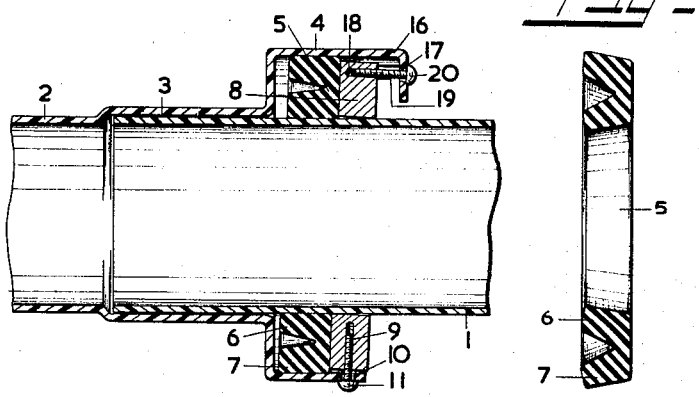
INVENTOR
WILHELMUS FRANCISCUS HENDRIKS
BY *McGlew and Toren*
ATTORNEY

3,362,729
PIPE COUPLING WITH PACKING ACTUATED
RESTRAINING RING
Wilhelmus Franciscus Hendriks, Doetinchem, Netherlands, assignor, by direct and mesne assignments, of one-half to Everardus Hendrikus Hendriks and one-half to John Henry Dortmans
Filed Feb. 18, 1965, Ser. No. 433,568
Claims priority, application Netherlands, Feb. 24, 1964, 64—1,728
3 Claims. (Cl. 285—105)

The invention relates to a pipe coupling consisting of a socket-shaped coupling member and a pipe end to be inserted, while inside the annular space between the inner wall of the coupling member and the outer wall of the pipe end to be inserted has been fitted an annular flexible sealing member, which in cross-section is substantially U-shaped, the open side of the sealing member being directed towards the inside of the coupling, so that the pressure exerted by a medium flowing through the pipe coupling is able to ensure the sealing action of the walls of the sealing member against the inner wall of the coupling member and the outer wall of the pipe end, while furthermore the coupling member has been provided with means preventing the sealing member being forced out of the coupling by the pressure of the medium.

Pipe couplings of this general type are known in the art. In this known coupling the means preventing the sealing member being forced out of the coupling by the pressure of the medium consist of a rectangularly bent edge of the coupling member. Against this edge rests the base of the flexible sealing member. When the sealing member has been fitted, the walls of the sealing member enclose a rigid clamping ring, which ensures that the sealing member is retained in the annular space between the coupling member and the pipe end. When a coupling has to be mounted, the pipe end is inserted into the coupling member, with the inner wall of the sealing member, which is directed obliquely inwards before the insertion of the pipe end, resting against the outer wall of the pipe end. As pressure is admitted into the pipe coupling the inner wall of the sealing member is forced by this pressure against the outer wall of the pipe end.

This known coupling involves several drawbacks. In the first place the fitting of the sealing member and the clamping ring in the coupling member is fairly difficult, owing to the rectangularly bent edge of the coupling member, but in the second place—and this is the most important drawback—it is always possible to pull the pipe end out of the coupling member, if one tries to do so. This is a serious drawback for pipe lines which are movable in the axial direction, since in this way it is not certain whether the pipes are really coupled. When the coupling is used with pipe lines which are fixed or have been arranged in the earth, this drawback does not play such an important part. However, it does with temporary pipe lines, such as pipe lines for artificial raining equipment, fire-extinguishing water pipes, pipe lines for household purposes, etc.

The object of the invention is to furnish a very simple coupling, which after the insertion of a pipe end is automatically locked. The coupling therefore can never become detached of itself.

This is achieved according to the invention by the feature that the means for retaining the sealing member consist of an annular rigid disc which is located with some clearance between the inner wall of the coupling member and the outer wall of the pipe end, which disc is connected with the coupling member in such a way that it can be tilted through a small angle, whereby the pressure of the medium flowing through the coupling assists in tilting the disc, the arrangement being such that in the tilted position the disc exerts a gripping action upon the pipe.

A withdrawal of the inserted pipe end causes an outward tilting of the disc and consequently a locking of the coupling. The outward tilting is also brought about and/or promoted by the pressure of the medium and the shape and size of the flexible sealing member.

As a matter of fact, when medium under pressure is admitted into the coupling, the walls of the sealing member will rest against the inner wall of the coupling member and the outer wall of the pipe end so as to seal them, and the medium will try to force the sealing member out of the coupling. In consequence the disc is slightly tilted until the inside of the disc grips the inserted pipe end. The sealing member is unable to move further outwards and a direct connection has been formed between the coupling member and the pipe end via the disc, while the sealing member only serves as a seal. The flexibility and the shape of the sealing member also causes a tendency of the base of the sealing member to move outwards, so that already owing to this the disc is tilted.

In spite of the fact that the disc grips the pipe end the coupling still remains slightly adjustable.

Preferably the disc is designed as a flat ring with a lip connected therewith, which has been passed with some clearance through an opening in the wall of the coupling member to form the tiltable connection, while the bent end part of the lip serves to disassemble the coupling.

This affords a structurally very simple and inexpensive solution, which nevertheless is very satisfactory in practice. The operation to unlock the coupling is very simple. One needs only to press upon the bent end part of the lip to return the disc to the straight position.

Further features and advantages of the invention will now be described by reference to the drawing, which illustrates two embodiments of the invention.

FIG. 1 is a longitudinal section of a single coupling, in which the socket-shaped coupling member is formed by one end of one of the pipes.

FIG. 2 is a longitudinal section of a double coupling, in which two pipe ends are coupled by a special coupling member constructed in a double form.

FIG. 3 is a longitudinal section of a coupling similar to that of FIG. 1 or FIG. 2, in which in the outwardly tilted position the disc is held locked by additional means, and FIG. 4 is a section of the flexible sealing member in the unassembled state.

In the coupling shown in FIG. 1 one pipe end 1, the spigot, has been inserted into the other pipe end 2, which for this purpose is provided with a staggered widening 3, 4. The smallest widening 3 surrounds the pipe end 1 with some relatively small clearance. The inner wall of the largest widening 4 and the outer wall of the pipe end 1 form an annular space, in which is placed a flexible sealing member 5, which, as appears from FIG. 4, is U-shaped in cross-section, with walls 6 and 7 slanting outwards in the unassembled state.

Placed behind the sealing member is an annular rigid disc 8, the outer diameter of which is smaller than the inner diameter of the widened section 4 and the inner diameter of which is larger than the outer diameter of the pipe end 1. This difference in diameter should be so great that the ring can assume a slightly inclined position. Differences in diameter of about 5 percent are satisfactory in practice. The disc 8 at one point is pivotally connected with the wall of the section 4. This can be brought about in a simple way by means of a small bolt 9 or the like, which has been screwed into a bore in the disc 8 via an opening 10 in the wall of the section 4.

The diameter of the opening 10 is larger than the outer diameter of the shank of the bolt 9. The head 11 of the bolt rests against the outer wall of the section 4. The bolt has not been screwed into the disc 8 to such a depth that the disc 8 is clamped against the inner wall of the section 4. When the bolt 9 has been screwed in, the disc 8 must be able to perform a movement in its own plane as well as a tilting movement. These movements are delimited by the clearances between the inner and outer walls of the disc 8 and the inner wall of the section 4 and the outer wall of the pipe end 1.

When the coupling is assembled, first the sealing member 5 is placed in the section 4, whereby the outer wall 6 of the sealing member 5 is urged to have a cylindrical shape. The disc 8 is then placed behind the sealing member and the bolt 9 is screwed in.

When the pipe end 1 is now inserted into the widened section 3 and 4 of the pipe end 2, this is found possible without any difficulty; the deformation of the inner wall 7 alone produces some resistance. However, it is not simply possible to remove the pipe end 1 again. In fact, when the pipe end 2 is pulled out, the disc 8 will pivot about the bolt 9 in the opening 10. In most cases this tilting will already take place automatically, since the sealing member 5 tries to force outwards the part of the disc 8 opposite the bolt. Again, the pressure of the medium, if any, flowing through the coupling ensures the tilting of the disc via the sealing member.

In the tilted position of the disc the edges of the disc, designated by 12 and 13 in FIG. 1, are vigorously forced against the wall of the pipe end 2. It will be obvious that in reality these are not point contacts, but line contacts, viz. over a part of the inner edges of the disc 8 adjacent to the points 12 and 13.

In practice it is also possible to round off or bevel the inner edges of the disc 8 slightly, so as to prevent excessive gripping and consequent damage to the pipe ends. In fact, in the case of certain weak pipe materials this might cause deformation of the pipe ends. For the rest the coupling is suitable for pipes of any type, both of hard or soft metals and of synthetic materials. It stands to reason that the disc 8 can also be made of a variety of materials, both of metal and or synthetic material.

The sealing member 5 is a normal, commercially available sealing ring and can be made of rubber or synthetic material.

The disassembly of the coupling is effected in a simple way by means of pressure on the end face of the disc 8 projecting from the section 4, viz. at the point opposite the bolt 9. In FIG. 1 this point is indicated with an arrow A. Since disassembly of a coupling naturally takes place only when the pressure in the pipe has been removed, the tilting-back of the disc 8 requires only a small force. Slight pressure from a finger suffices.

It will be obvious that the pivotal attachment of the disc 8 in the section 4 can also be effected in various other ways. Thus it is possible to fix a headless pin in the disc. When the disc is inserted, the pin is then passed from the inside through the opening 10. It is also possible to use a fixed hinge, the legs of which are fastened respectively to the section 4 and the disc 8. In this way the disc 8 forms a kind of lid for the space inside the section 4, the lid lying inside the section 4 in the closed position.

Another possibility is shown in FIG. 2. This coupling is substantially similar to that according to FIG. 1, but here the two pipe ends 1 and 2 are connected by a coupling sleeve 14 and the disc 8 is constructed differently. Moreover, the section 4 has an inwardly bent flange 4a. The coupling sleeve 14 consists of a cylindrical section 3 and of two widened sections 4. In the middle of the section 3 has been provided a buffer ridge 15, which is to prevent a pipe end being inserted too far into the coupling sleeve 14, in consequence of which there would be insufficient room for the other pipe end.

In the embodiment according to FIG. 1 such a buffer ridge is formed automatically at the beginning of the section 3, although a buffer ridge is not absolutely necessary in this embodiment.

The disc 8 according to this embodiment is designed as a flat ring and carries a bent lip 8a. The first part of this lip 8a projects through the opening 10 and serves as a pivot for the ring. The part of the lip 8a projecting out of the opening 10 is bent and serves to place the ring at right angles to the pipe when the coupling is disassembled. The disc with lip according to this embodiment is very easy to operate and very cheap to manufacture.

FIG. 3 shows a method for forcibly locking the disc 8 in its tilted gripping position. This can be done by fastening a lip 16 on or to the section 4 opposite the pivoting point of the disc 8. It stands to reason that the lip can also be integral with the part 16. This lip is bent rectangularly inwards. In this bent part a hole 17 is present, while opposite the latter in the disc 8 a threaded blind channel 18 has been provided. When through the hole 17 a bolt 19 with a head 20 is screwed into the channel 18, the disc will be tilted, if this has not already happened, and will be clamped in the tilted position. It stands to reason that the hole 17 must surround the shank of the bolt 19 with some clearance, since in the tilted position of the disc the bolt will assume a position forming an angle with the longitudinal axis of the coupling.

This locking again can be effected in several other ways.

Owing to this locking it is not possible to disassemble the coupling by means of some pressure from the finger. In some cases this may be favourable.

It is possible to join the sealing member 5 and the disc 8 together so as to form one unit. To achieve this, the base of the sealing member can be fixed by glueing, vulcanization, or the like on one of the end face of the disc. Under some circumstances this may present advantages for the assembly of the coupling, since the already very small number of parts is thus reduced by one more.

The coupling according to the invention can be applied in practice on a large scale, both for fixed and for temporary pipe lines.

Thus, when a fixed pipe line has been laid in the earth, a subsidence will not affect the coupling, because of the gripping action of the disc on the pipe end, so that the pipe ends are prevented from shifting relative to each other in the axial direction. With a view to this it is not necessary to use the embodiment according to FIG. 3. The locking in the axial direction is automatic.

The field of application of the invention, however, is conceived to be in particular that of temporary, movable pipe lines, such as used in irrigation works, artificial raining equipment for agriculture, fire-extinguishing water pipes, etc. These lines often have to be assembled and disassembled by non-experts. Now this can be done very rapidly and easily with the coupling according to the invention.

The coupling according to the invention is also particularly suitable for fastening, for instance, a garden hose to a tap, as well as a so-called anti-splash nozzle. These can simply be pushed on the tap, after which they are automatically locked. When the disc 8 is pressed by the finger, e.g. through the lip 8a, the disc is straightened again, the gripping action is eliminated, and the coupling can be interrupted.

The coupling can also be used in a simple way as a reducing coupling, for connecting pipe ends of different diameters.

The pipe ends need not be machined. Thus, cast pipes can at once be coupled. Variations in size do not have any great influence. Variations in size of the diameter of the pipes amounting to about 5 percent can be taken without any difficulty by the coupling.

What I claim is:

1. In a pipe coupling including a coupling member formed with a socket having a peripheral wall portion and an end wall, a pipe end inserted in the socket with substantial annular clearance with a peripheral wall portion of the socket, an annular flexible sealing member of resilient compressible material, U-shape in radial cross section, embracing the pipe end and engaging the inner surface of the socket peripheral wall portion, with the open side of the sealing member facing the inside of the socket so that the pressure medium flowing through the pipe coupling will force the sealing member into tight sealing engagement with the pipe end and with the socket peripheral wall portion; and means engaging the closed side of the sealing member retaining the sealing member against displacement out of the socket by the pressure of the medium: said retaining means comprising a single annular disk of rigid material, having an appreciable axial thickness, positioned in said socket, outwardly relative to said sealing member, with some radial clearance with the pipe end and with said socket peripheral wall portion; and connecting means connecting said disk to said coupling member for tilting of said disk through a relatively small angle; whereby the pressure of said medium on said sealing member will tilt said disk so that edge portions of its inner periphery will exert a gripping action upon said pipe end; said disk being a substantially flat ring; said socket peripheral wall portion having a small cross section substantially rectangular aperture therethrough; said connecting means comprising a substantially rectangular cross section and substantially flat finger integral with said disk and extending radially therefrom and, with a relatively small clearance, through said aperture, the portion of said finger outwardly of said socket being bent toward said peripheral wall portion and away from said end wall and serving as means for tilting said disk, by pivoting of said finger about an edge of said small cross section aperture, into a substantially diametric plane to provide for disassembly of said coupling.

2. In a pipe coupling including a coupling member formed with a socket, a pipe end insert in the socket with substantial annular clearance with a peripheral wall portion of the socket, an annular flexible sealing member, U-shape in radial cross section, embracing the pipe end and engaging the inner surface of the socket peripheral wall portion, with the open side of the sealing member facing the inside of the socket so that the pressure medium flowing through the pipe coupling will force the sealing member into tight sealing engagement with the pipe end and with the socket peripheral wall portion, and means retaining the sealing member against displacement out of the socket by the pressure of the medium; said retaining means comprising an annular disk of rigid material, having an appreciable axial thickness, positioned in said socket, outwardly relative to said sealing member, with some radial clearance with the pipe and with said socket peripheral wall portion; and connecting means connecting said disk to said coupling member for tilting of said disk through a relatively small angle; whereby the pressure of said medium on said sealing member will tilt said disk so that edge portions of its inner periphery will exert a gripping action upon said pipe end; said peripheral wall portion being formed with an aperture; said connecting means comprising a screw having a threaded shank and a head, and inserted through said aperture with the shank threaded into a threaded radial recess in said disk only to an extent maintaining substantially said radial clearance of said disk with said socket peripheral wall portion and with said head engaged with said peripheral wall portion; the cross sectional area of said aperture being greater than that of said shank, for tilting of said disk.

3. In a pipe coupling including a coupling member formed with a socket, a pipe end inserted in the socket with substantial annular clearance with a peripheral wall portion of the socket, an annular flexible sealing member, U-shape in radial cross section, embracing the pipe end and engaging the inner surface of the socket peripheral wall portion, with the open side of the sealing member facing the inside of the socket so that the pressure medium flowing through the pipe coupling will force the sealing member into tight sealing engagement with the pipe end and with the socket peripheral wall portion, and means retaining the sealing member against displacement out of the socket by the pressure of the medium: said retaining means comprising an annular disk of rigid material, having an appreciable axial thickness, positioned in said socket, outwardly relative to said sealing member, with some radial clearance with the pipe end and with said socket peripheral wall portion; connecting means connecting said disk to said coupling member for tilting of said disk so that edge portions of its inner periphery will exert a gripping action upon said pipe end; said connecting means comprising a screw having a threaded shank and a head, and inserted through said aperture with the shank threaded into a threaded radial recess in said disk only to an extent maintaining substantially said radial clearance of said disk with said socket peripheral portion and with said head engaged with said peripheral wall portion, the cross sectional area of said aperture being greater than that of said shank, for tilting of said disk; means on said coupling member engaged with said disk for locking said disk in the tilted position; said last-named means comprising a lip on said socket extending substantially radially inwardly and formed with an aperture therethrough; and a threaded element engaged through said aperture and threaded into a bore extending inwardly from the outer end surface of said disk; said lip and said bore being located diametrically opposite said connecting means.

References Cited

UNITED STATES PATENTS

| 2,090,550 | 8/1937 | Pilblad. | |
|---|---|---|---|
| 2,184,376 | 12/1939 | Beyer | 285—105 |
| 2,230,725 | 2/1941 | Nathan | 285—340 |
| 2,447,221 | 8/1948 | Warring | 285—340 |
| 2,819,733 | 1/1958 | Maisch | 285—320 |
| 2,912,260 | 11/1959 | Wray | 285—280 |
| 3,185,504 | 5/1965 | Perrot | 285—105 |
| 3,272,538 | 9/1966 | Bergstrom | 285—321 X |

FOREIGN PATENTS

| 557,701 | 1/1956 | Canada. |
|---|---|---|
| 284,564 | 2/1928 | Great Britain. |

CARL W. TOMLIN, *Primary Examiner.*

R. G. BERKLEY, R. GIANGIORGI,
*Assistant Examiners.*